June 13, 1939.     R. F. PEO     2,162,538
DRY ICE AIR CONDITIONING UNIT FOR VEHICLES
Filed Oct. 19, 1936     3 Sheets-Sheet 1
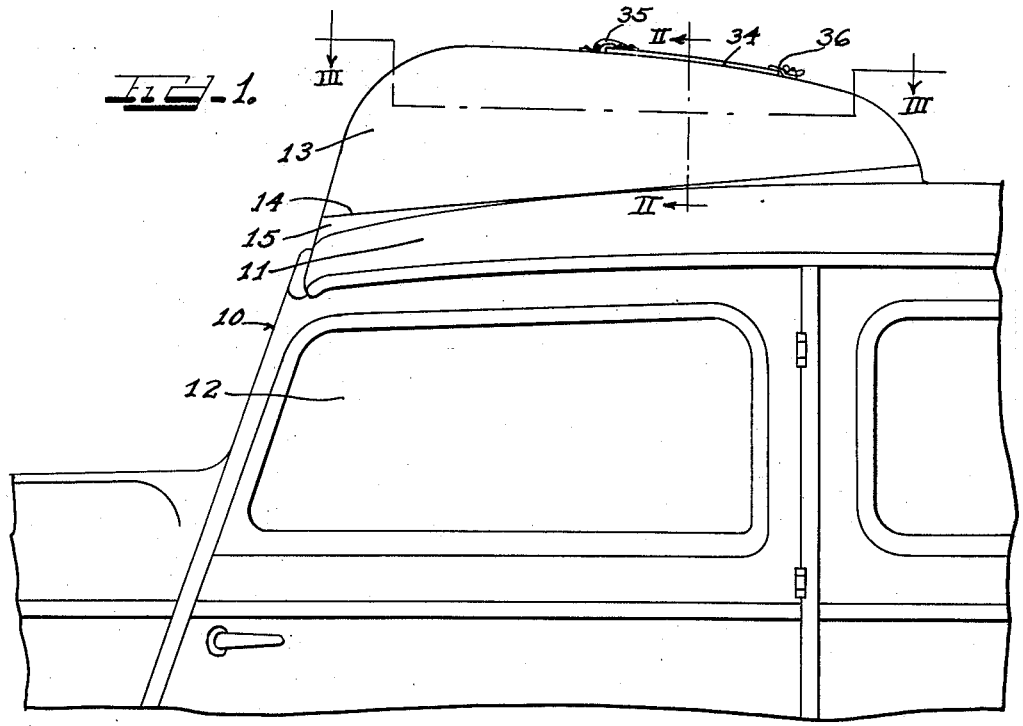
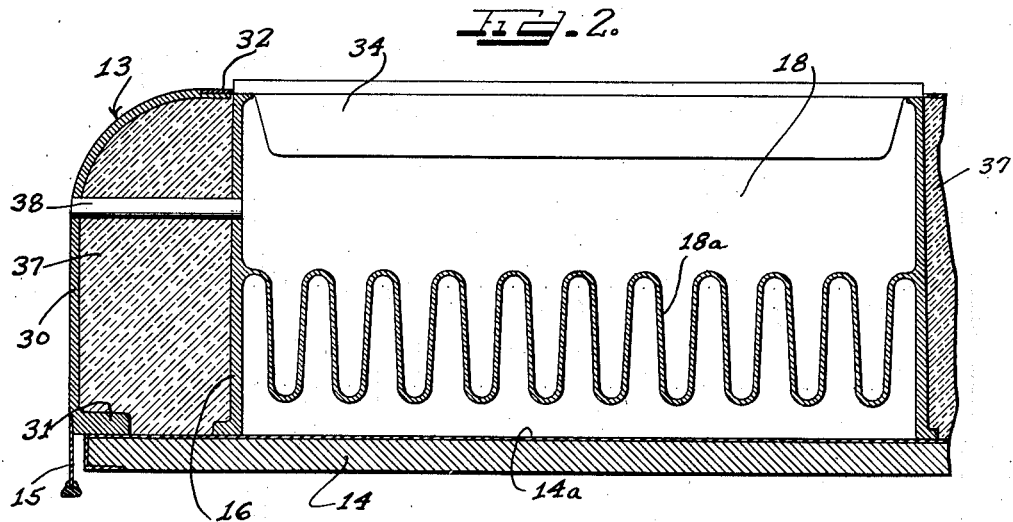
Inventor
RALPH F. PEO.
by Charles O'Neill
Attys.

June 13, 1939.    R. F. PEO    2,162,538
DRY ICE AIR CONDITIONING UNIT FOR VEHICLES
Filed Oct. 19, 1936    3 Sheets-Sheet 2
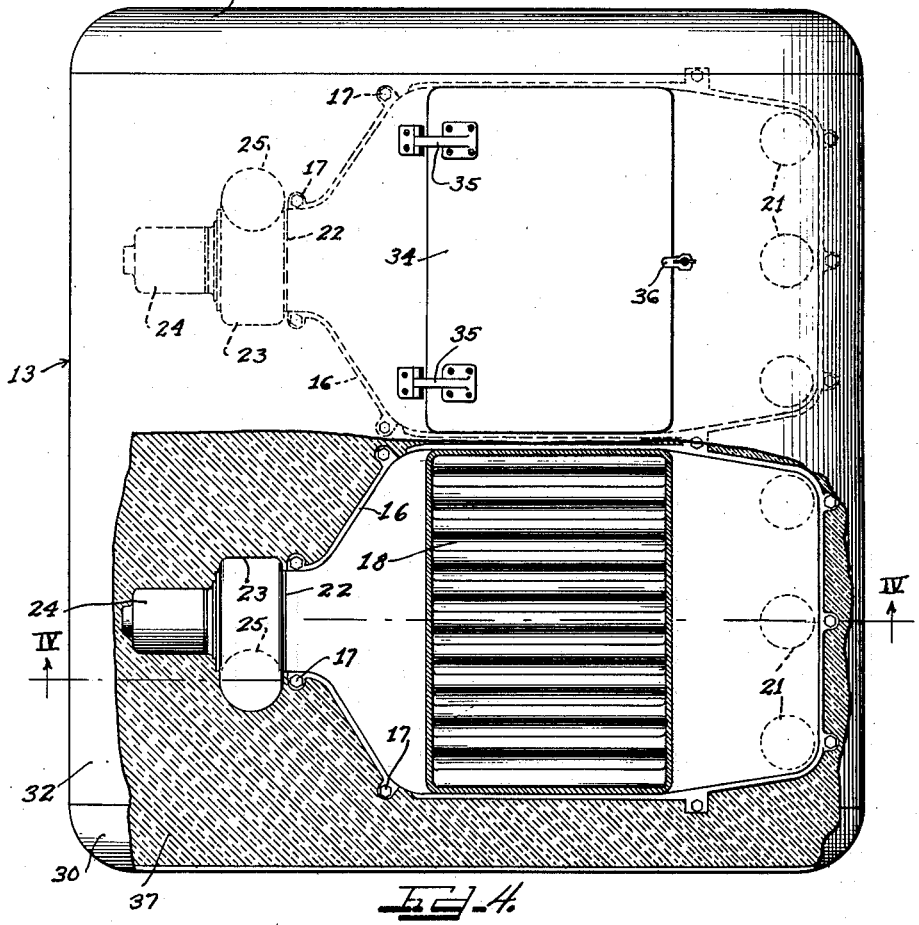
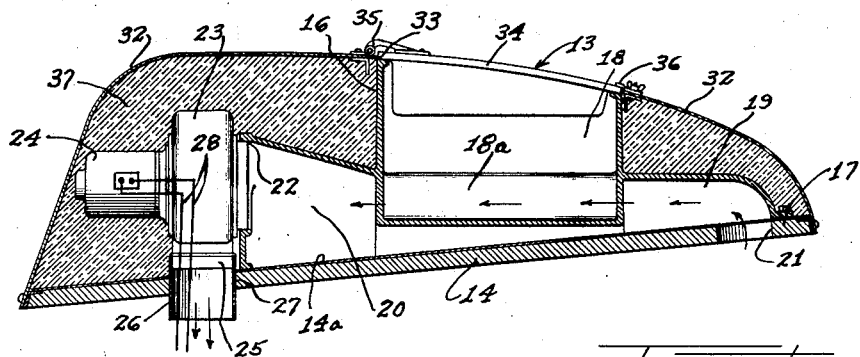
Inventor
RALPH F. PEO.

June 13, 1939.  R. F. PEO  2,162,538
DRY ICE AIR CONDITIONING UNIT FOR VEHICLES
Filed Oct. 19, 1936  3 Sheets-Sheet 3
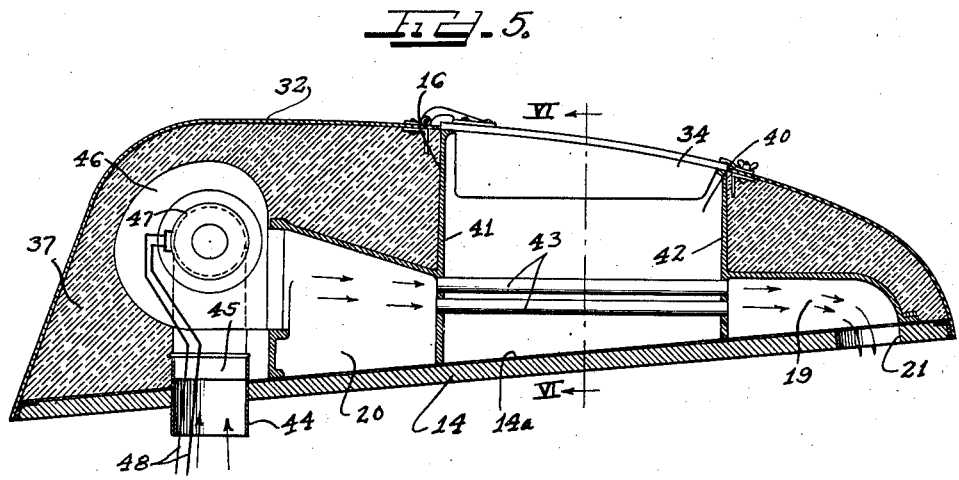
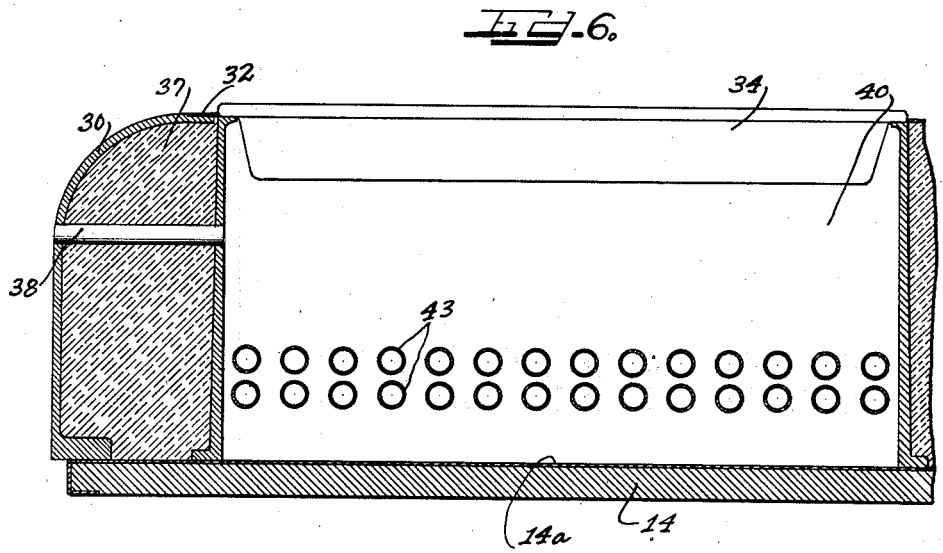
Inventor
RALPH F. PEO.

Patented June 13, 1939

2,162,538

UNITED STATES PATENT OFFICE 2,162,538

DRY ICE AIR CONDITIONING UNIT FOR VEHICLES

Ralph F. Peo, Buffalo, N. Y., assignor to Houde Engineering Corporation, Buffalo, N. Y., a corporation of New York Application October 19, 1936, Serial No. 106,328

9 Claims. (Cl. 62—13)

This invention relates to air cooling units adapted to be mounted on the roofs of vehicles for cooling the interior of the vehicle.

More specifically this invention relates to compact air conditioning units mountable on the roofs of automotive vehicles and equipped with insulated chambers for dry ice or other cooling agent and containing air circulating means for withdrawing air from the interior of the vehicle, circulating the withdrawn air into thermal contact with the cooling agent to be cooled thereby and propelling the cooled air back into the vehicle.

The invention will be hereinafter specifically described in connection with closed passenger type automobiles but it should be understood that the units of this invention are adapted to be mounted on the roofs of all types of vehicles having a storage space, passenger compartment or the like to be cooled.

According to this invention a compact streamlined unit is built up on a supporting base, preferably a flat plate, and the entire unit is mounted on the roof of an automobile body. Air connections to the interior of the body are provided by merely cutting a plurality of small holes through the roof of the vehicle and joining these holes with flexible tubing to the inlet and discharge ports in the base of the unit. The unit contains one or more insulated chambers for receiving the cooling agent. Access to the interior of the chamber is provided by doors hingedly carried on top of the unit. The cooling chambers are arranged so as to provide a maximum amount of heat absorbing surface for cooling air circulated around the chamber. A motor driven blower is preferably provided for each chamber to withdraw air from the interior of the vehicle over the heat absorbing surfaces of the cooling compartment and for propelling the cooled air back into the interior of the vehicle.

The units are readily mountable on any type of automobile roof and a shroud ring or band is preferably used around the base of the unit to fit the contour of the particular roof on which the unit is mounted. In this manner a standard unit can be mounted on any type of automobile roof and streamlined to the contour of the roof by separate shroud bands designed for the particular roof.

The units of this invention require no mechanical connection to the automotive vehicle other than the provision of small intake and discharge ports through the roof of the vehicle and the connection of electric wires to the vehicle battery or to the generator of the motor driving the vehicle.

It is then an object of this invention to provide air cooling units mountable on the roofs of automotive vehicles for cooling air withdrawn from the interior of the vehicles by thermal contact with a cooling agent housed in the unit.

A further object of this invention is to provide dry ice operated air conditioning units adapted to be mounted on the roof of automotive vehicles for cooling air withdrawn from the vehicle interiors and for propelling the cooled air back to the vehicle interior.

A further object of this invention is to provide air cooling units of standard design for mounting on the roofs of all types of vehicles and to adapt the standard units to a particular roof contour by a separate shroud ring, provided for that particular roof contour.

A further object of the invention is to provide a roof mounted icebox for automotive vehicles and to carry air circulating means in said box for withdrawing air from the interior of the vehicle over the ice cooled chambers in the unit and for propelling the cooled air back to the interior of the vehicle.

A further object of this invention is to provide standardized self-contained units for mounting on the roofs of automotive vehicles to cool the interior of the vehicles.

Other and further objects of this invention will become apparent to those skilled in the art from the following detailed description of the annexed sheets of drawings which disclose preferred embodiments of the invention.

On the drawings:

Figure 1 is a fragmentary side elevational view of an automobile body of the sedan type having an air conditioning unit according to this invention mounted on the roof thereof.

Figure 2 is an enlarged fragmentary vertical cross-sectional view, with a part in elevation, taken substantially along the line II—II of Figure 1.

Figure 3 is a top plan view of the air conditioning unit shown in Figure 1 with a part broken away and shown in horizontal cross-section along the line III—III of Figure 1.

Figure 4 is a vertical cross-sectional view taken substantially along the line IV—IV of Figure 3.

Figure 5 is a vertical cross-sectional view of an alternative form of air conditioning unit according to this invention.

Figure 6 is an enlarged fragmentary vertical cross-sectional view, with parts shown in elevation, taken substantially along the line VI—VI of Figure 5.

As shown on the drawings:

In Figure 1 the reference numeral 10 designates generally a passenger automobile body of the closed type having a rigid roof 11 and a passenger space 12. According to this invention an air conditioning unit 13 mounted on a flat base plate 14 is secured to the roof 11 of the automobile body 10. The unit 13 is one of a standardized size and shape and is fitted to the individual contour of the roof 11 by means of a shroud skirt 15 secured to the base 14 of the unit and extending downwardly therefrom to snugly fit the roof line contour. The shroud skirt is the only part of the units of this invention which must be designed to fit a particular roof line contour.

The air conditioning unit 13 is streamlined to offer a minimum air resistance.

As best shown in Figures 2, 3 and 4 the air cooling unit 13 comprises one or more rigid members 16 such as castings bolted to the base plate 14 of the unit by means of bolts 17. The base plate 14 is preferably covered with a metal sheet 14a as shown in Figures 2 and 4. The castings 16 define relatively deep open topped receptacles 18 for the cooling agent and smaller air receiving passageways 19 and 20 on each end of the receptacles 18.

The receptacles 18 have corrugated bottoms 18a in spaced relation from the base plate 14 of the unit to provide large heat absorbing surfaces for air passing therearound from the passageway 19 into the passageway 20 of the members.

The base plates 14 and 14a of the unit 13 are provided with a plurality of openings 21 therethrough in communication with the passageways 19 of the members 16. The openings 21 communicate with openings cut through the roof 11 of the automobile body 10 so that air from the interior 12 of the body can be drawn into the passageway 19 of the members 16.

The portions 20 of the members 16 are formed to provide circular mouths 22 thereon for receiving the intake sides of blowers 23. The blowers 23 can be rigidly clamped in the mouths 22 and thus suppored by the members 16. Electric motors 24 are mounted on the blower casings 23 for driving the blowers.

The ports 25 of the blowers 23 can conveniently receive flexible tubing 26 therearound. The tubing 26 extends through openings 27 in the base plates of the unit and can be conveniently inserted in corresponding openings formed through the roof 11 of the vehicle body. Similar tubing can connect the openings 21 in the base plates of the unit with the openings formed through the roof of the vehicle.

Conduit wires 28 for energizing the motor 24 can conveniently pass through the tubing 26 and through the roof 11 where they can be threaded behind the upholstery in the vehicle into connection with the storage battery or motor generator for supplying current to the motor 24.

Comparatively heavy gauge curved metal plates 30 form the sides of the unit 13 as shown in Figures 2 and 3. These plates are secured to the base plate 14 as at 31 (Figure 2). A light gauge metal sheet 32 is secured at its ends to the plate 30 and forms the outside top covering for the unit 13. As shown in Figure 4 the sheet metal 32 is bent to provide a streamlined contour for the unit and is apertured as at 33 above the receptacles 18 of the members 16. The receptacles 18 are closed by heavily insulated doors 34 hingedly connected to the sheet metal 32 or to the members 16 by means of hinges 35. The doors are held in closed position by means of locking fingers 36.

Insulation 37 is packed all around the members 16, motors 24 and blowers 23 and extends solidly to the walls 30 and 32 forming the outer casing of the unit. The insulation 37 is preferably of the molded type and can be made in preshaped blocks to snugly fit around the elements in the unit.

Breather tubes or vents 38 are provided as shown in Figure 2 to permit the escape of gases from the receptacles or chambers 18. The tubes 38 can conveniently pass through the side walls of the receptacles and side plates 30 of the units.

From the above descriptions it should be understood that the units 13 according to this invention are made in standardized sizes and are mounted on flat bases. The units contain one or more members such as castings which provide chambers for refrigerant and define with the base plate passageways for air passing through the units to be cooled by thermal contact with the cooling agent receptacles. The members have been described as castings but it should be understood that the same can be built up from separate elements. These members are well insulated from the atmosphere and from the sun rays so that most of the cooling capacities of the cooling agents inserted into the receptacles or ice boxes is utilized for cooling air withdrawn from the interior of the vehicle. This air flows through the vehicle roof through openings provided therein into the passageways 19 formed in the members 16. From the passageways 19 the air circulates along the corrugated bottoms of the cooling agent receptacles and is cooled by thermal contact therewith. The cooled air is then directed through a passageway 20 and is blown back into the car through the roof thereof by means of the fan or blower.

In some installations only one member 16 may be used while in other installations as many as three or four members 16 can be used depending upon the width and size of the automobile on which the unit is to be mounted. It should be understood, of course, that the dry ice or other cooling agent is readily inserted into the receptacles 18 by merely opening the doors on top of the unit. These doors are formed with outer contours conforming with the streamlined shape of the unit.

The unit described in Figures 1 to 4 receives air from the rear portion of the vehicle and propels the cooled air into the front portion of the vehicle over the driver's seat. It should be understood, of course, that the direction of air circulation can be reversed and that the cooled air can be discharged to the rear portion of the vehicle. This reversal of the air flow would be desirable in taxicab installations.

The cooled air is introduced at the top of the vehicle where it can readily diffuse downwardly around the passengers without creating uncomfortable cold blasts. Likewise the air to be cooled is removed from the top of the vehicle since the warm air in the vehicle rises to the top.

In Figures 5 and 6 there is illustrated an alternative form of unit in which the air flow is reversed and a different type of heat exchanger is used. Parts identical with parts described in Figures 1 to 4 have been identified with the same reference numerals.

In Figures 5 and 6 the cooling agent receptacle 40 of the members 16 is not provided with a bottom such as is described in Figures 2 to 4 but, on the other hand, extends to the base plate 14a. In other words the end walls 41 and 42 defining the receptacle 40 extend downwardly into tight engagement with the metal plate 14a on the base plate 14 thereby blocking off the passageway 19 from the passageway 20. However the walls 41 and 42 are provided with a plurality of openings therethrough for receiving the ends of metal tubes 43 which extend through the receptacle 40. The cooling agent inserted in the receptacle 40 can be packed around the tubes 43 to cool the same.

Air from the vehicle interior is withdrawn through openings in the vehicle roof into the flexible tubing 44 communicating with the intake port 45 of a blower 46. The blower 46 is propelled by a motor 47 actuated by current supplied from the vehicle storage battery or generator through electric wires 48. The blower 46 propels the air through the passageway 20 into the tubes 43 where it is cooled by thermal contact therewith. The cooled air then circulates through the passageway 19 and downwardly through the openings 21 in the base plate of the unit and through openings provided in the vehicle roof to the passenger space of the vehicle. Obviously the direction of the air can be reversed so that air from the vehicle is received in the passageway 19 and discharged through the flexible tubes 44.

The invention therefore broadly comprises standardized air cooling units to be mounted on the roofs of vehicles for housing cooling agents to cool air withdrawn from the vehicle interior. The units include air circulating means and heat exchangers for obtaining a maximum absorption of heat from the air circulated therethrough. The units are readily adapted to conform with particular roof contours by means of individually cut shroud skirts readily fastened around the units.

Cooling agents are conveniently loaded into the unit through doors formed on the tops thereof. The units can be made of standardized designs and need not be architecturally built for any particular car. They can be manufactured separately as an accessory readily installed on any make of vehicle. Only small openings need be cut through the roof of the vehicle and the roof structure is thereby not weakened. No driving connections are necessary other than the electric wires for energizing the blower motor.

The unit on the roof of a vehicle serves a secondary function in that it provides an insulated chamber above the roof protecting the roof against heating by the sun's rays and even against the cold. The passenger or storage space under the roof is thus further insulated from heat or cold by the unit, irrespective of whether or not the elements in the unit are operating. The invention therefore includes the provision of a secondary roof over the vehicle roof and insulating the spaces therebetween to further insulate the passenger or storage space under the vehicle roof. The insulated space between the roofs, when the unit is operating, is cooled by a cooling agent, and a fluid, such as air, is cooled in the space and circulated to the passenger or storage space of the vehicle. The cooled space above the roof obstructs the passage of heat to the vehicle body.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An air conditioner for vehicles comprising a substantially flat base plate having air inlet and outlet openings therethrough, a casting secured to said plate defining a central ice chest and passageways on each side of the chest communicating respectively with said inlet and outlet openings in the base plate, said ice chest having a heat exchanger surface providing ducts connecting the passageways, a blower secured to the casting for propelling air from the inlet ports through the ducts and out of the outlet ports, insulation surrounding said casting and blower and a covering carried by the base plate surrounding said insulation to provide a streamlined contour for the unit.

2. A standardized automobile air conditioner adapted to be mounted on the roof of a closed type automobile comprising a substantially flat base plate, a member secured to said base plate defining a central ice chest and passageways on each side of the chest, said ice chest having a heat exchanger surface providing ducts connecting the passageways, a blower secured to said member for propelling air through the passageways, insulation surrounding said member and said blower, a metal covering surrounding said insulation, said covering having an aperture above said ice chest, an insulated door closing said aperture and a shroud skirt surrounding said base plate to conform with the particular roof contour on which the air conditioner is mounted.

3. A self-contained standardized air conditioner for rigid roofed automobiles comprising a streamlined insulated housing having a flat base, said base having air inlet and outlet ports therein, a member in said housing defining an open topped ice chest, an insulated door on top of said housing giving access to the ice chest, a blower in said housing for propelling air around the ice chest to be cooled by contact therewith, an electric motor in said housing for driving the blower, and a skirt adapted to be secured to the base plate around the housing for fitting the housing to the contour of the automobile roof on which it is mounted.

4. A mounting for an air conditioner comprising a housing adapted to be carried on the roof of a closed type automobile and a shroud skirt detachably secured around the base portion of the housing and pre-formed to engage the roof and conform with the contour of the roof on which the housing is to be carried whereby a standardized housing is usable on all types of roofs by selection of a particular type of shroud skirt for each roof contour.

5. An air conditioner for mounting on the roof of a closed type vehicle comprising a base plate having air inlet and outlet openings therethrough, a member mounted on said base plate defining in the central portion thereof an open-topped ice chest and passageways on each side of the ice chest communicating respectively with said inlet and outlet openings in the base plate, a plurality of tubes extending through said ice chest connecting the passageways provided by said member, a blower secured to said member for propelling air from the inlet opening through the passageways for discharge through the outlet opening, insulation surrounding said member and blower, a door for closing the top of the ice chest and a sheet metal covering member carried by the base plate and surrounding said insulation to provide a streamlined contour for the unit.

6. An air conditioning unit for an automotive vehicle comprising a substantially flat base plate having air inlet and outlet openings therethrough, a member secured to said plate and defining with the plate a first passageway and a second passageway in spaced relation and communicating respectively with said inlet and outlet openings in the base plate, said member providing an ice chest between said passageways, said ice chest having a heat exchange surface forming a wall of a chamber establishing communication between said passageways, a blower communicating with one of said passageways to direct air against said heat exchange surface to be cooled by contact therewith, insulation surrounding said member and blower, a casing carried from said base plate enclosing the insulation and providing a streamlined contour for the unit and a door giving access to said ice chest.

7. An air conditioning unit for vehicles comprising a base plate having a plurality of air inlet and outlet openings through the front and rear thereof, a plurality of castings on said plate in spaced parallel relation, each casting defining a central ice chest and passageways on each side of the ice chest communicating respectively with one or more inlet openings and one or more outlet openings in the base plate, said ice chests having heat exchange surfaces providing ducts connecting the passageways, blowers secured to the castings for propelling air from the inlet ports through the ducts out of the outlet ports, insulation surrounding said castings and blowers, and a covering carried by the base plate surrounding said insulation to provide a stream-lined contour for the unit.

8. A standardized automobile air conditioner adapted to be mounted on the roof of a closed type automobile comprising an insulated housing for mounting on the roof of the vehicle having air ports adapted to register with openings provided through the roof whereby air from the interior of the vehicle may circulate through the housing, air cooling means in said housing and a shroud skirt surrounding the bottom portion of the housing and pre-formed to engage the roof and to conform with the particular roof line contour.

9. A self-contained air conditioning unit for automotive vehicles comprising a streamlined heat insulated housing mounted on a base plate, said base plate having air inlet and air outlet ports therein, a blower in said housing for propelling air through the housing, a motor in said housing for driving said blower, an ice chest in said housing in the path of said air and a door in said housing giving access to the chest whereby said housing can be mounted on the roof of an automobile and operated to cool the air in the automobile with a cooling agent in the ice chest thereof by cutting holes through the roof to register with the ports in the base plate and connecting the blower motor with a source of current on the vehicle.

RALPH F. PEO.